United States Patent
Beckmann et al.

(10) Patent No.: US 6,727,686 B2
(45) Date of Patent: Apr. 27, 2004

(54) METHOD AND DEVICE FOR DETECTING INCORRECT POLARITY IN A SIGNAL TRANSDUCER FORMED AS AN INDUCTIVE SENSOR

(75) Inventors: Joern Beckmann, Hemmingen (DE); Ralf Klewin, Stuttgart (DE); Armin Sayer, Ostelsheim (DE); Athanasios Hailas, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/168,915

(22) PCT Filed: Dec. 15, 2000

(86) PCT No.: PCT/DE00/04476
§ 371 (c)(1),
(2), (4) Date: Sep. 16, 2002

(87) PCT Pub. No.: WO01/48488
PCT Pub. Date: Jul. 5, 2001

(65) Prior Publication Data
US 2003/0090261 A1 May 15, 2003

(30) Foreign Application Priority Data
Dec. 24, 1999 (DE) .......................................... 199 63 007

(51) Int. Cl.[7] .................. G01P 13/00; G01P 3/488; G01R 31/06; F23Q 23/10
(52) U.S. Cl. ................... 324/173; 324/165; 324/207.15; 324/207.25; 324/546; 123/406.18; 702/104
(58) Field of Search ................... 324/202, 160, 324/163–166, 173, 174, 207.12, 207.15–207.22, 207.25, 538, 546; 702/90, 104, 145, 150; 123/406.18, 406.58, 617

(56) References Cited

U.S. PATENT DOCUMENTS

| | | | |
|---|---|---|---|
| 4,533,902 A | * | 8/1985 | Baker et al. ........ 324/207.25 X |
| 4,972,332 A | | 11/1990 | Luebbering |
| 5,371,460 A | | 12/1994 | Coffman |
| 5,977,764 A | * | 11/1999 | Riedle et al. ................ 324/165 |
| 6,208,131 B1 | * | 3/2001 | Cebis et al. ................. 324/165 |
| 6,229,302 B1 | * | 5/2001 | Varady et al. .......... 324/207.25 |

FOREIGN PATENT DOCUMENTS

| | | |
|---|---|---|
| DE | 197 23 866 A | 12/1998 |
| WO | 97 19358 A | 5/1997 |

* cited by examiner

Primary Examiner—Gerard R. Strecker
(74) Attorney, Agent, or Firm—Michael J. Striker

(57) ABSTRACT

A method and a device for detecting mispolarization in a signal transducer is described, with which the output signal of the signal transducer—that has at least one singularity—is converted into a square-wave signal. Intervals between specifiable signal-level changes are monitored in the region of the singularity, or plausibility windows are set, within which specifiable events must occur. If the intervals do not correspond to the expected intervals, or if specifiable events do not occur within the specifiable time windows or plausibility windows, mispolarization is detected. The method for detecting mispolarization is used, for example, in the case of a signal transducer having a plurality of uniform angular points and one reference point, but it is not limited to such transducers.

8 Claims, 3 Drawing Sheets

METHOD AND DEVICE FOR DETECTING INCORRECT POLARITY IN A SIGNAL TRANSDUCER FORMED AS AN INDUCTIVE SENSOR

BACKGROUND OF THE INVENTION

The invention is based on a method and a device for detecting incorrect polarity in a signal transducer, in particular in an inductive sensor according to the general class of the primary claim.

BACKGROUND OF THE INVENTION

Signal transducers, in particular the types that operate according to the principle of induction, are used today for the most diverse applications. For example, inductive signal transducers are used to register the speed or angle of rotating shafts. Signal transducers are used in particular to register the angle of the crankshaft or another shaft in a motor vehicle, in which said signal transducers a stationary sensor scans the rotating shaft or a toothed rotor interconnected with the rotating shaft. The toothed rotor thereby comprises a plurality of angular points on its surface; when it moves past the sensor, AC voltage having positive and negative half-waves is induced in the sensor. This AC voltage is a direct representation of the surface of the toothed rotor. The voltage is typically converted into square-wave voltage to improve further processing. For this purpose, it is compared, in a processing circuit, with specifiable threshold values and, every time such a threshold value is reached, the level of the square-wave output signal changes. Since the fact as to whether or not the high signal level is caused by a rising flank or a falling flank of an angular point is essential to the evaluation of this signal, e.g., in an engine control unit or a microprocessor, monitoring must be performed to determine if the transducer is mispolarized or not. This is necessary because an inductive transducer typically has two connection possibilities.

A method and a device for detecting the correct or incorrect polarization of signal transducers is made known in DE-OS 197 23 866. In the case of this known method and the known device, it is assumed that the toothed rotor to be scanned comprises a plurality of identical angular points, whereby the angular points are designed so that the signal generated in the sensor—after conversion into a square-wave signal—has a curve that depends on the direction of movement. Two threshold values are taken into consideration when the output signal from the sensor is converted into the square-wave signal; every time said threshold values are reached, a signal-level reversal is triggered.

SUMMARY OF THE INVENTION

The method according to the invention and the device according to the invention for detecting incorrect polarity in a signal transducer have the advantage that they operate very reliably and can be used with any toothed rotor having a number of identical angular points and one reference point, whereby no special requirements are placed on the form of the angular points or the length of the angular points based on the intervals between the angular points. The method according to the invention or the device according to the invention can be used particularly advantageously in conjunction with a toothed rotor of the type that is standard today in internal combustion engines. Such a toothed rotor comprises 60-2 angular points distributed uniformly on its surface, and the reference point is formed by the two missing angular points. Such an "incremental rotor" is used to register the angle of the crankshaft of the internal combustion engine. The evaluation of the angle measurement is carried cut in the control unit of the internal combustion engine. In addition to this evaluation procedure, incorrect polarity of the transducer can be detected according to the invention. In particularly advantageous fashion, this detection of incorrect polarity takes place independently of the rest of the signal evaluation. The conditions under which the detection of incorrect polarity are to be carded out can be applied in advantageous fashion. One of these conditions can be a specifiable speed range, for example, or the detection of incorrect polarity is carried out only when the internal combustion engine is in an overrun state, or only when speed is constant, or only if the speed fluctuations remain within specifiable limits.

In a further particularly advantageous fashion, time measurements are carried out between specifiable angular points to detect mispolarization, whereby certain time windows are set, for example, within which the expected signal flank must appear if mispolarization is not present.

Further advantages of the invention are obtained by means of the measures described in the dependent claims.

BRIEF DESCRIPTION OF THE DRAWINGS

An exemplary embodiment of the invention is shown in the figures in the drawing and will be explained in greater detail in the subsequent description. In particular.

DESCRIPTION OF THE PREFERRED EMBODIMENTS

Figure 1:
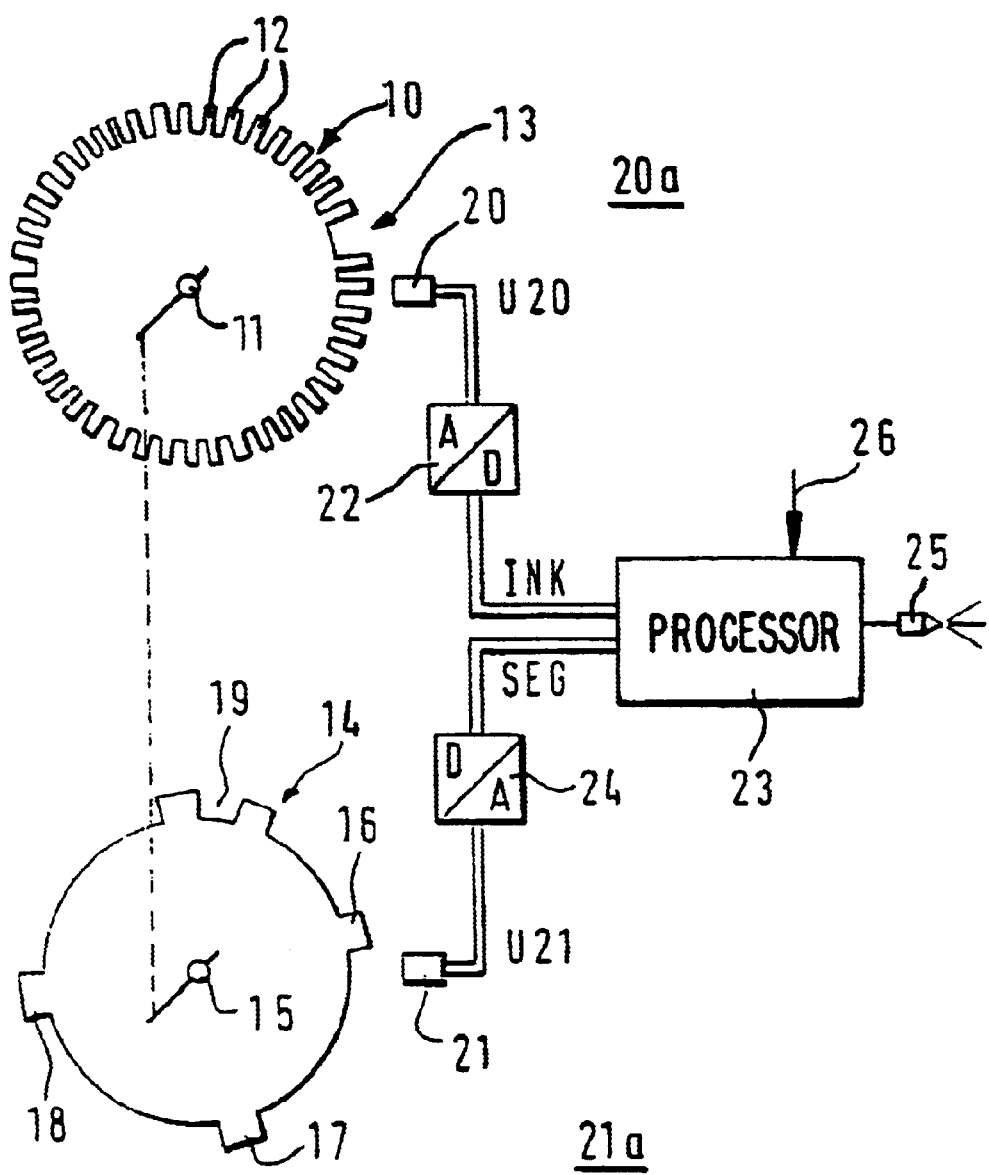
FIG. 1 shows the components of a system for controlling an internal combustion engine that are most important to understanding the invention, in which said system the device according to the invention or the method according to the invention can preferably be used.

FIG. 1 shows the components of a system for the open-loop control of an internal combustion engine that are most important to understanding the present invention, in which said system the device according to the invention or the method according to the invention can preferably be used. In particular, a toothed rotor is labelled with numeral 10, which said toothed rotor is rigidly connected to the crankshaft 11 of the internal combustion engine and comprises a plurality of identical angular points 12 on its circumference, which said angular points are equidistant from each other. In addition to these identical angular points 12, a reference point 13 is provided that is formed, for example, by two missing angular points, by way of which a greater interval is formed between the two adjacent, identical angular points.

The toothed rotor 10 is scanned by the sensor 20, which transmits an output signal when the angular points pass by. The output signal has positive and negative half-waves generated by the flanks of the angular points. The toothed rotor 10—also referred to as an "incremental rotor"—and the sensor 20 associated with it form, together, the sensor 20 A, the output signal U 20 of which is to be evaluated. Since the output signal U 20 is to be converted into a square-wave signal before further processing, it is forwarded to an analog/digital converter 22, which then forwards the digitized signal to the processor 23, which performs the signal evaluation. The processor 23 is a component of the control unit of a motor vehicle, for example. The analog/digital-converted output signal U 20 of the transducer 20 A is also referred to as the incremental signal, "INK".

A second toothed rotor 14 is interconnected with the camshaft 15 of the internal combustion engine and has a number of angular points—"segments"—around its circumference, the number of which corresponds to the number of cylinders in the internal combustion engine, for example. One of these angular points is thereby formed as a double point and is used to match the crankshaft angle to cylinder 1. This angular point—which includes the individual marks—is labelled with the numeral 19, and the remaining angular points are labelled with numerals 16, 17, and 18. The intervals between the rear flanks of the angular points are identical. The toothed rotor 14 is scanned with the aid of a sensor 21 that forwards an output signal U 21 having positive and negative half-waves that are formed every time the angular points pass by. After analog/digital conversion takes place in an analog/digital converter 24, square-wave-signals are produced, which are also referred to as segment signals, "SEG". They are also forwarded to the processor 23. The segment rotor 14 and the sensor 21 are also referred to as the segment transducer 21 A.

The microprocessor processes the incremental and segment signals to generate triggering signals 25, e.g., for the injection of fuel. These signals are labelled with the numeral 25. Further data 26 are required for this purpose, which are forwarded to the processor 23 via further inputs E. The process of obtaining these data, e.g., using suitable sensor s, will not be described further here.

If one of the two transducers 20A, 21A is operated with incorrect polarity, its output signal U 20 or U 21 changes in the fashion shown in FIG. 2. So that a correct polarization or incorrect polarity can be reliably detected, the method—described in greater detail hereinbelow—is carried out to detect incorrect polarity. This method takes place in the processor 23. If the processor 23 is a component of the control unit of an internal combustion engine, the method according to the invention takes place in addition to the heretofore-standard open- and closed-loop control functions, e.g., for injection. If the only purpose of the processor is to evaluate the output signals of a transducer, the processor can be used exclusively for signal evaluation and detection of incorrect polarity.

Signal curves representing the crankshaft angle under various conditions are shown in FIG. 2. In particular, FIG. 2A shows the surface of the toothed rotor 10 with the angular points 12 and the reference point 13, which is formed by means of two missing angular points. The output signal U 20 of the transducer 20A is plotted in FIG. 2B, provided that the transducer was not connected with incorrect polarity, and that the toothed rotor 10 turns at a constant speed. In this case, signal peaks occur at the transition from angular point to gap, and signal lows occur at the transition from gap to angular point. If the signal U 20 according to FIG. 2B is converted, in an analog/digital converter, into a digital signal or a square-wave signal, the signal shown in FIG. 2C results, provided that the transition from low to high or from 0 to 1 takes place at the zero transition point, and the transition from high to low or from 1 to 0 takes place when an operating point S 1 is reached. The analysis of the signal curve according to FIG. 2C shows that the low phases of the square-wave signal are always of the same length when speed is constant, while the high phase is much longer in the region of the reference points than in the region of the remaining angular points.

Figure 2A:
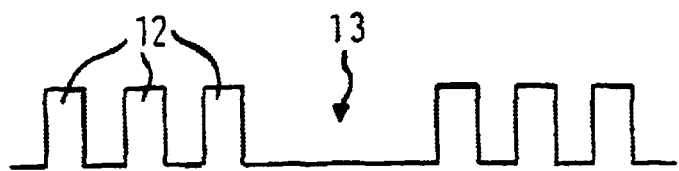
FIGS. 2A–2E show various signal curves that are obtained in the case of non-incorrect polarity or incorrect polarity transducers. The associated angular paints of the toothed rotor are also shown.
Figure 2B:
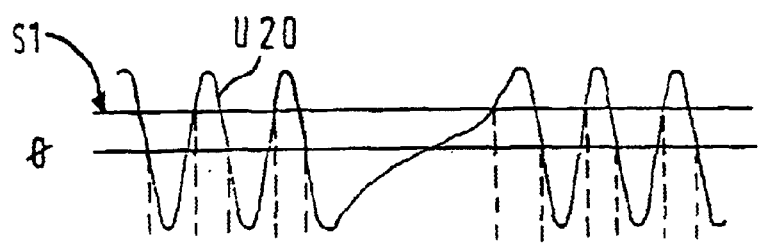
Figure 2C:
Figure 2D:
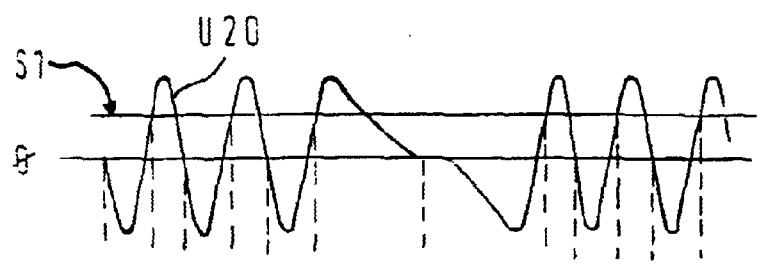
Figure 2E:

The output signal U 20 of the transducer is shown in FIG. 2D for the case in which a incorrect polarity connection was made. The output signal U 20 is then at a maximum every time the transition from gap to angular point passes the transducer, and it is low when the transition from angular point to gap appears. If the signal according to FIG. 2D is convened from analog to digital in the same fashion as the signal according to FIG. 2A, the square-wave signal curve shown in FIG. 2E results. In the case of this signal curve it becomes clear that the low phases are of different lengths, whereby a low phase occurs in the region of the reference point that is markedly longer than the low phases in the region of the uniform angular points. The signal pauses having different lengths result because the voltage drop is very great in the region of the gap due to the magnetic latching of the transducer. By evaluating the signal pauses, it is possible to determine whether the transducer was connected in non-incorrect polarity or-incorrect polarity fashion. For this purpose, the time measurements commonly carried out by the processor between specifiable angular points are investigated to the effect that an additional inquiry is carried out as to whether low phases of different lengths occur.

Figure 3A:
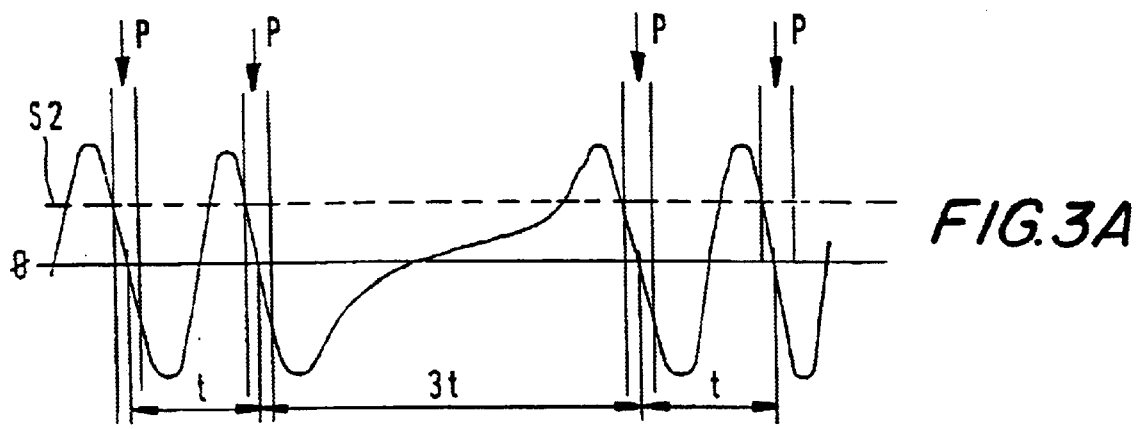
FIGS. 3A–3C show further signal curves.
Figure 3B:
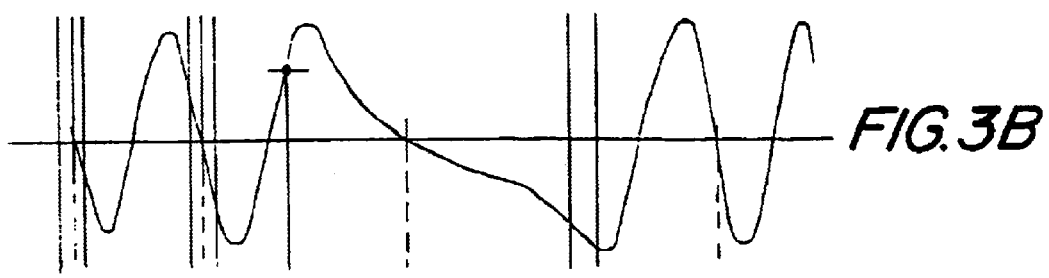
Figure 3C:
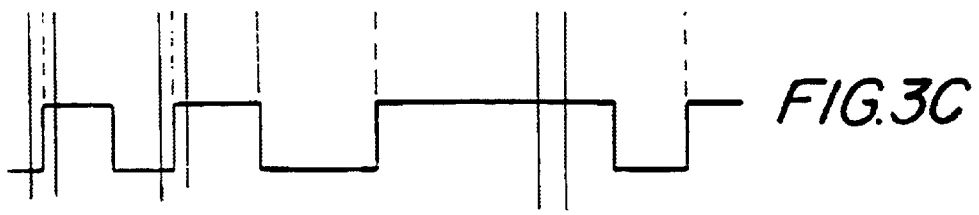

Further signal curves are shown in FIG. 3, by way of which a second evaluation method is explained. FIG. 3A shows the signal curve, once more, in the case of a non-incorrect polarity transducer. The time between two zero transition points thereby amounts to t if uniform angular points am involved, and 3 t if the reference point is involved. To determine whether the transducer is polarized correctly or not, "dynamic plausibility windows" are formed in which the zero transition point of the signal is expected. If the transducer is incorrect polarity, it transmits an output signal like the one shown in FIG. 3B. It is to be taken into consideration that, in the case of a incorrect polarity transducer, the signal curve is shifted by one-half of an angular point interval as compared with the illustration shown in FIG. 3A, so that the highs and lows lie under one another in each case when uniform angular points are involved. If the signal according to FIG. 3A or 3B is converted into a square-wave signal (FIG. 3C), a plausibility window P can be specified in a "agate array", and monitoring can be carried out to determine whether a zero transition point occurs within a plausibility window P. If this is not the case, a signal curve occurs as shown in FIG. 3C, and a zero transition point lies outside the plausibility window P, while a zero transition point is not detected within the plausibility window. Incorrect polarity can be detected by reviewing these circumstances.

The conversion into a square-wave signal takes place, for example, so that signal-level changes of the square-wave signal always take place at the zero transition point of the analog signal (operating point S0) and when an operating point S1 (FIG. 2) or S2 (FIG. 3) is reached.

If the signal examinations are carried out at a high speed, the signal curves are to be evaluated particularly exactly, due to the system. Very narrow plausibility windows are then set, within which a zero transition point is to be expected. The detection of incorrect polarity can basically take place in a simple system, in which only the signal evaluation of a speed sensor is carried out. If the invention is used in conjunction with the signal evaluation in a vehicle control unit, the detection of incorrect polarity can take place in addition to the usual signal evaluation and utilize the hardware configuration that is there anyway. For example, the dynamic plausibility of a gate array can be used in the region of the reference point gap to detect incorrect polarity.

As an alternative, the incorrect polarity detection described hereinabove for an incremental rotor can also be carried out for a segment rotor, in which a segment point is formed, e.g., by means of a double point, as shown in FIG. 1. In this case as well, when incorrect polarity—is present, a significantly different signal curve occurs in the region of the double point as compared with the signal curve when the transducer is connected correctly. Detection of incorrect polarity can be carried out in the previously-mentioned evaluation system in an internal combustion engine, in which the crankshaft sensor as well as the camshaft sensor are evaluated. This detection of incorrect polarity can be used to examine both transducers for incorrect polarity. The two should not be examined simultaneously, but rather in sequence in specifiable fashion. The detected incorrect polarity can be displayed and/or electronically compensated.

Special speed sensor s were mentioned as an exemplary embodiment for the invention. In principle, the invention can also be carried out for other signal analyses, in which a signal curve that is dependent on the direction of movement appears at a singularity, or in which, in general, a signal curve that is dependent on the direction of rotation is apparent.

What is claimed is:

1. A method for detecting an incorrect polarity in a signal transducer formed as an inductive sensor, comprising the steps of scanning a toothed rotor having a specifiable number of identical angular points arranged equidistant from one another; forwarding an output signal having positive and negative half-waves, each of which is generated by flanks of the angular points; converting the output signal in evaluation means into a square-wave signal so that every time an initial first operating point is reached, an initial signal-level change takes place, and when a second specifiable operating point is reached, a second signal-level change takes place; evaluating time intervals between the signal-level changes to detect an incorrect polarity; providing the toothed rotor with a reference point identifiable by its greater interval between two adjacent angular points; and detecting the incorrect polarity when the time intervals of a specifiable signal-change in a region of the reference point do not correspond to expected time intervals.

2. A method as defined in claim 1; and further comprising carrying out the detection of incorrect polarity only when a speed of the toothed rotor fulfills a specifiable condition and is greater than a specifiable speed.

3. A method as defined in claim 1; and further comprising providing the second operating point which corresponds to a zero transition point.

4. A method as defined in claim 1; and further comprising providing the initial first operating point as a specifiable positive voltage generated in the evaluating means and adjusted as a function of previous signals, if necessary.

5. A method as defined in claim 1; and further comprising carrying out the detection of incorrect polarity as long as the time interval of a signal-level change of the square-wave signal from a low to high is shorter than a time of the low signal-level between two uniform angular points.

6. A method as defined in claim 1; and further comprising setting time windows that are formed as a function of previously-determined times; performing a check to determine whether unexpected signal flank occurs within the time window; and if this is not the case, detecting the incorrect polarity.

7. A device for detecting an incorrect polarity in a signal transducer formed as an inductive sensor, comprising means for scanning a toothed rotor having a specifiable number of identical angular points arranged equidistant from each another; means for forwarding an output signal having positive and negative half-waves, each of which is generated by flanks of the angular points; evaluation means for converting the output signal into a square-wave signal, whereby every time an initial first operating point is reached, an initial signal-level change takes place and, when a second specifiable operating point is reached, a second signal-level change takes place; means for evaluating time intervals between the signal-level changes to detect an incorrect polarity; said toothed rotor being provided with a reference point identifiable by its greater interval between two adjacent angular points; and means for detecting incorrect polarity when the time intervals of a specifiable signal-change in a region of the reference point do not correspond to expected time intervals.

8. A device as defined in claim 7, wherein said evaluation means include a microprocessor that performs necessary time measurements.

* * * * *